May 4, 1965   E. J. BERLO   3,181,382
MACHINE TOOL
Original Filed June 24, 1959   4 Sheets-Sheet 1

INVENTOR.
ERNEST J. BERLO
BY
Carl Hoppe
ATTORNEY

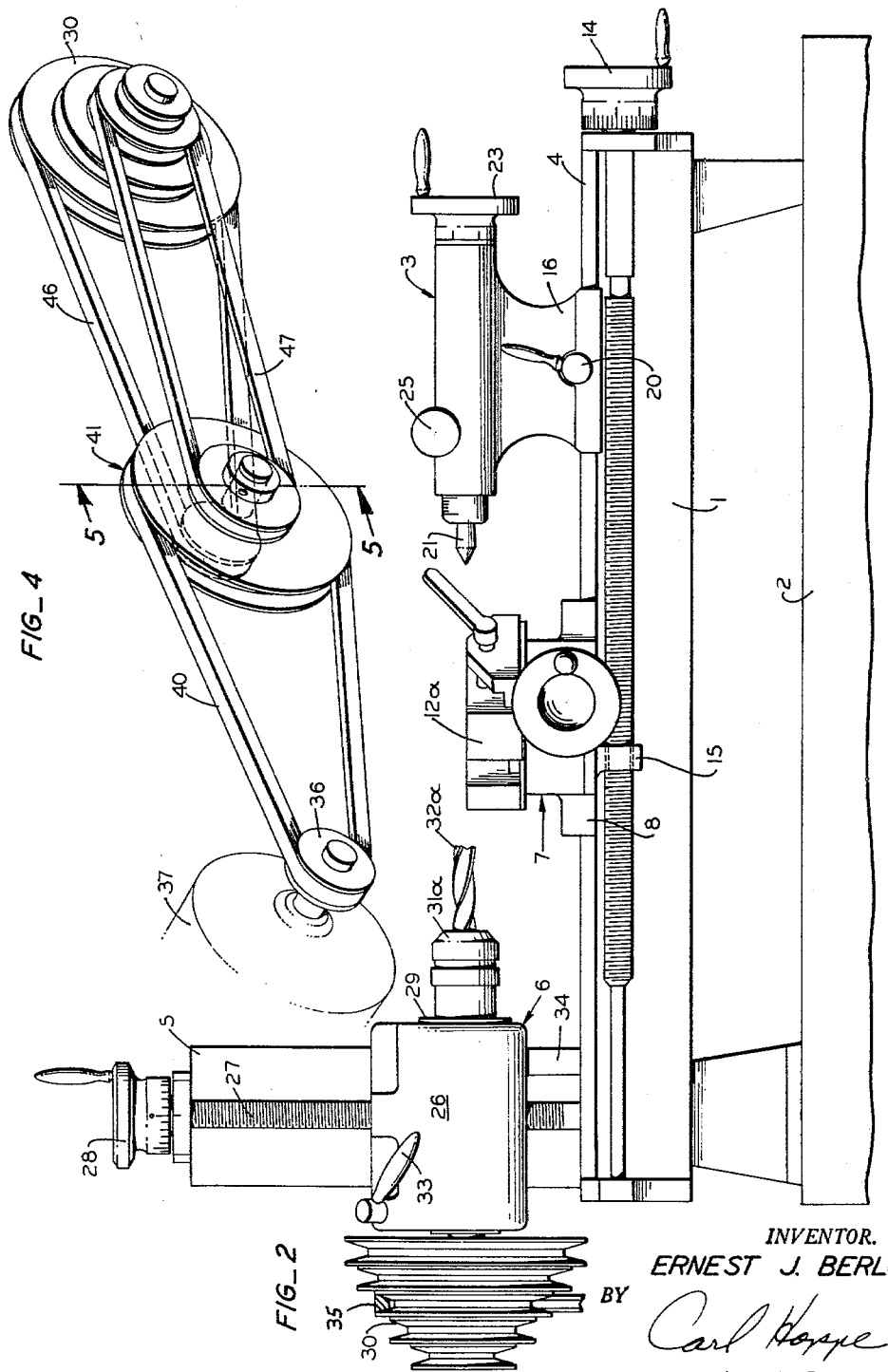

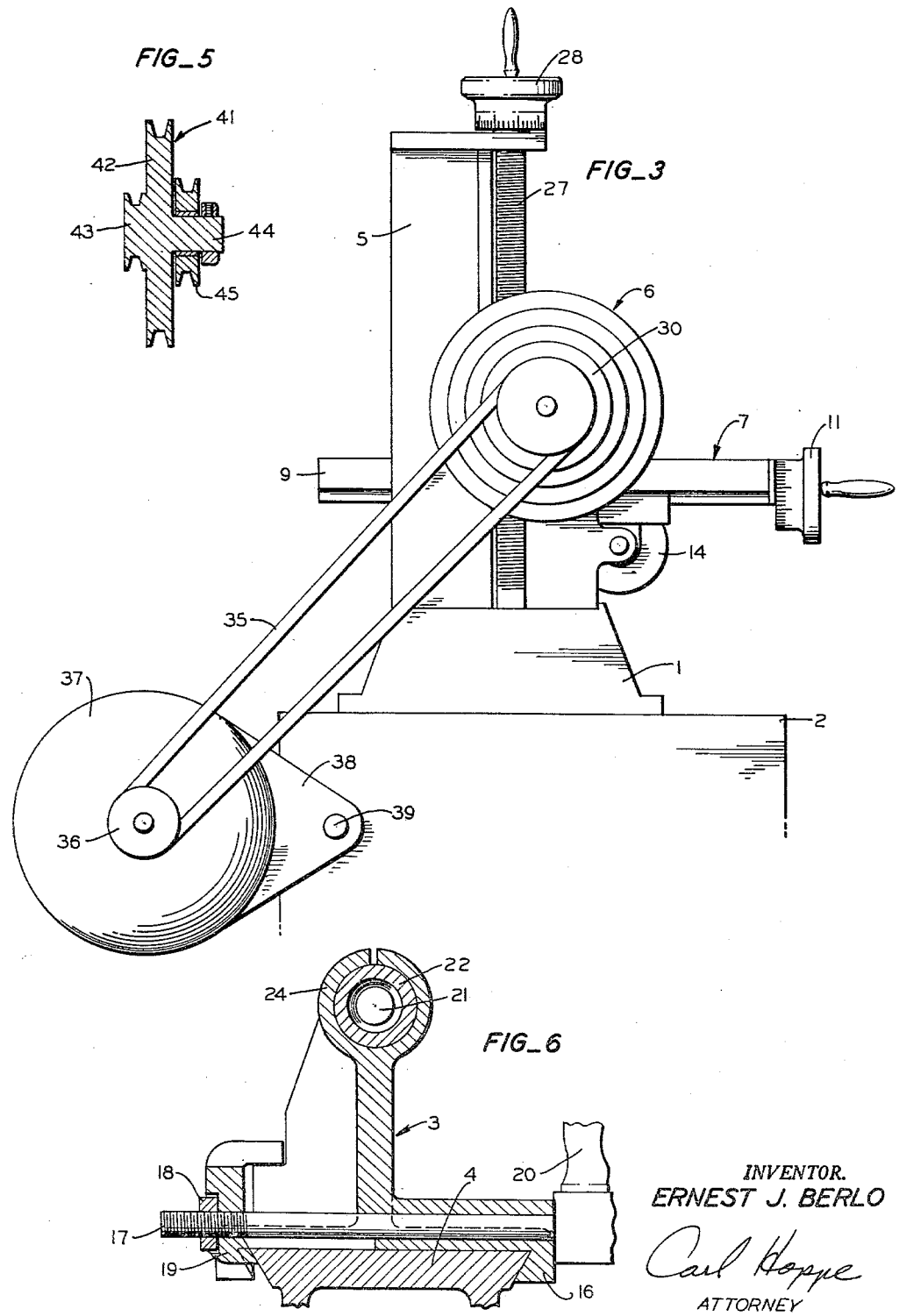

May 4, 1965  E. J. BERLO  3,181,382
MACHINE TOOL
Original Filed June 24, 1959  4 Sheets-Sheet 4
FIG_7
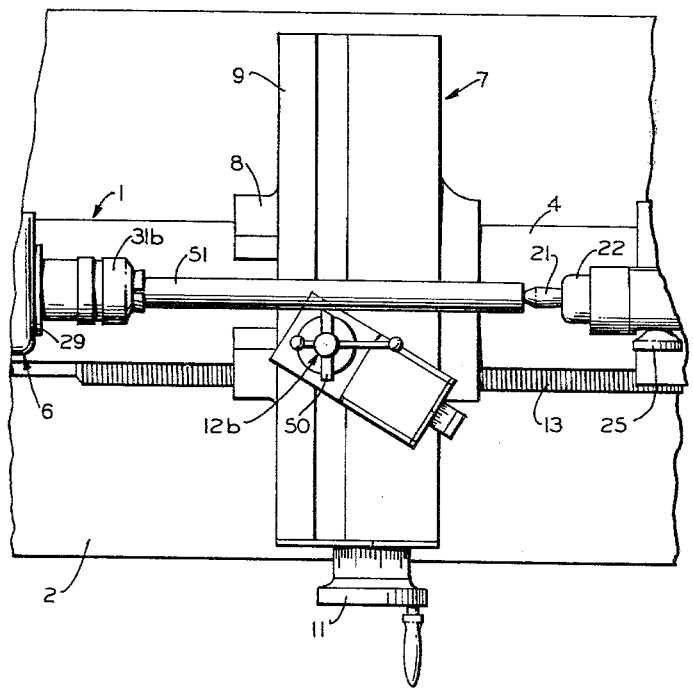
INVENTOR.
ERNEST J. BERLO
BY
Carl Hoppe
ATTORNEY United States Patent Office 3,181,382
Patented May 4, 1965

3,181,382
MACHINE TOOL
Ernest J. Berlo, 184 Nueva Ave., San Francisco 24, Calif.
Original application June 24, 1959, Ser. No. 822,526.
Divided and this application Nov. 23, 1962, Ser. No. 240,214
2 Claims. (Cl. 74—217)

This invention relates generally to machine tools, and more particularly to an improved combination milling machine and lathe. The present application is a division of application Serial No. 822,526, filed June 24, 1959, and now abandoned.

Heretofore lathes have not been well-suited for doing milling work because their various parts have been designed primarily for vertical thrust loads developed by the cutting tool as it engages the workpiece, whereas a milling operation using the lathe headstock as a tool holder develops horizontal thrust as well as those in a vertical direction. Others have sought to provide machine tools upon which both milling work and turning work may be performed, but none has the necessary rigidity required for milling operation. This is particularly true with respect to lightweight bench-type tools designed for the home craftsman.

It is therefore an object of this invention to provide a lightweight bench-type machine tool which has the necessary rigidity and provides the accuracy required for milling operations, and yet which may be used for simple turning work.

It is another object of this invention to provide in a machine tool a single vertically shiftable headstock utilized both as a spindle on which turning work may be secured and as a spindle for holding a milling cutter.

It is a further object of this invention to provide an improved multiple belt speed reducer adapted for use with a vertically shiftable headstock.

These and numerous other objects and advantages may become more apparent from the following detailed description when considered in connection with the accompanying drawings. The present invention is comprised of a pair of ways disposed in planes perpendicular to one another, a vertically shiftable headstock which constitutes both a milling head and a lathe spindle, a tailstock, and a horizontally shiftable carriage which constitutes either a work support or a tool rest. Referring to the drawings:

FIG. 2 is a side elevational view of this particular embodiment;

FIG. 3 is an elevational view of the headstock end of the present invention showing the motor drive;

FIG. 4 is a partial perspective view of the multiple-belt speed reducer;

FIG. 5 is a cross section of the speed reducer pulleys taken along line 5—5 in FIG. 4;

FIG. 6 is a cross-sectional view of the tailstock assembly taken along line 6—6 of FIG. 1; and FIG. 7 is a top view of the unit with a barstock collet mounted on the spindle and a compound tool rest mounted on the cross-feed table.

Figure 1:
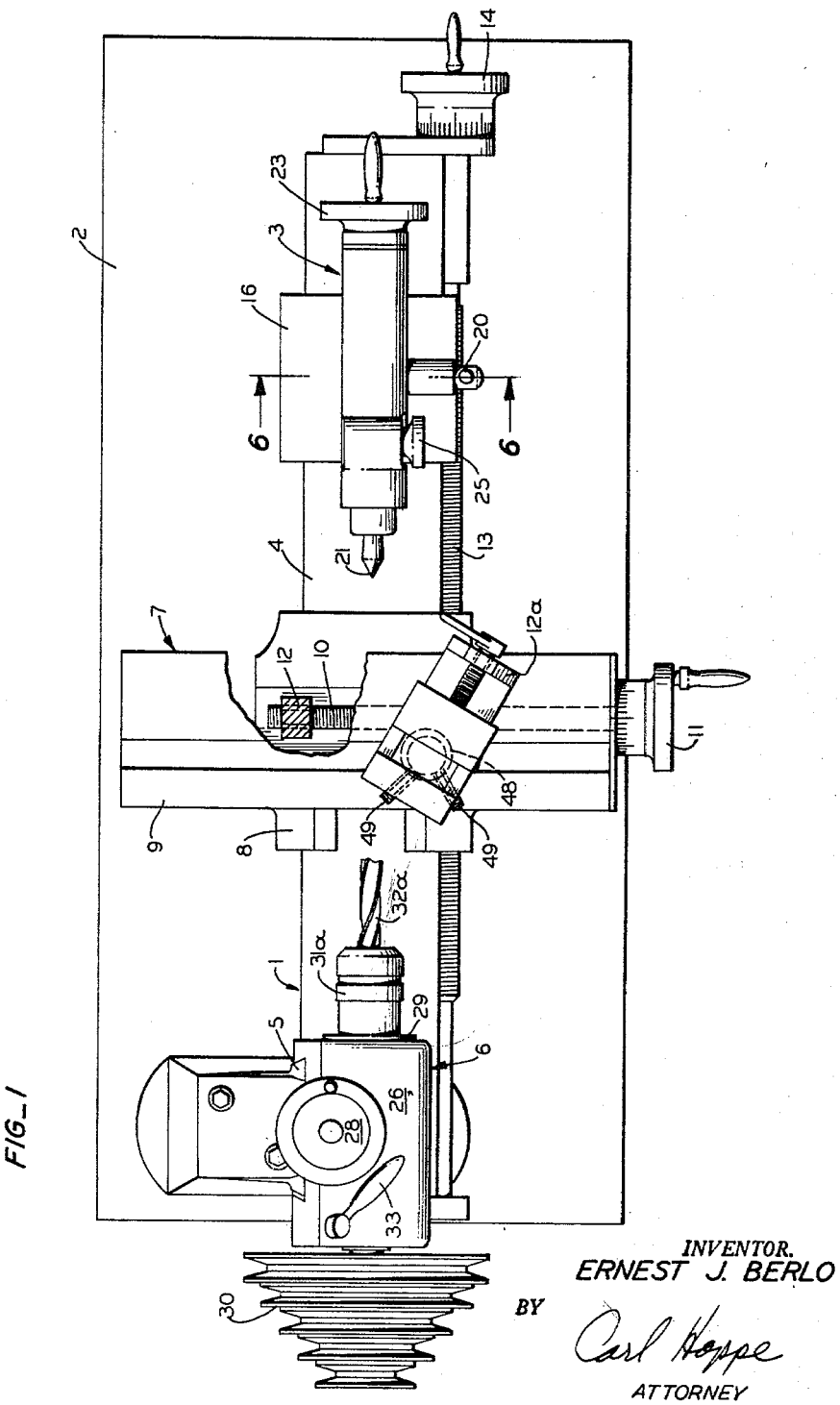
FIG. 1 is a top view of a machine tool embodying features of the present invention and having several parts broken away to more clearly illustrate the structure.

Referring to the drawings in detail wherein like numerals have been employed to designate similar parts throughout the various figures, it will be observed that the particular embodiment illustrated comprises a rigid bed 1 which is typical of small bench-type lathes. The bed 1 rests upon a bench 2 or table of convenient working height. A tailstock assembly, referred to generally as 3, is mounted upon horizontal ways 4 carried on the bed 1. Vertical ways 5 are rigidly mounted on the bed 1 with the face of the vertical ways lying in a plane perpendicular to the horizontal ways 4 and parallel to the longitudinal axis thereof.

A vertically shiftable headstock assembly 6 is mounted on the vertical ways 5 and a carriage assembly referred to as 7 is slidably mounted on the horizontal ways 4.

The carriage assembly 7 comprises a saddle 8 dovetailed on the horizontal ways 4 upon which is supported a cross-fed milling table 9. As illustrated in FIG. 1 the table 9 is fed transversely across the horizontal ways 4 by means of the cross-feed screw 10 rotated by the cross-feed handwheel 11 and fitting into the cross-feed nut 12 secured to the saddle 8. A vise 12a is mounted on the cross-fed table 9 and holds a workpiece during milling operation. Alternatively, the cross-feed table 9 may carry a compound tool rest 12b, as illustrated in FIG. 7, to perform turning operations.

The carriage assembly 7 is moved along the horizontal ways 4 by means of a lead screw 13 mounted adjacent the horizontal ways 4 and extending the full length thereof. The lead screw 13 is manipulated by the lead screw handwheel 14 conveniently mounted at the tailstock end of the horizontal ways 4. The lead screw 13 engaged a threaded lug 15 depending from the saddle 8 so that rotation of the handwheel 14 moves the carriage assembly longitudinally along the horizontal ways 4.

The tailstock assembly 3, appearing in section in FIG. 6, is of a type that will be familiar to those skilled in this art. The assembly has a segmented base 16 which dovetails over the horizontal ways 4. A tailstock clamp screw 17 passes through the base of the tailstock and by means of the locking nut 18 secures the segmented portion 19 of the tailstock base 16 to the ways 4 thereby holding the tailstock assembly 3 firmly in a particular position. The tailstock clamp screw 17 is pivoted by the handle 20. It will be observed in FIG. 6 that when the segmented portion 19 of the tailstock base has been loosened, the entire tailstock assembly 3 can be pivoted off the horizontal ways 4 at any position of the assembly, rather than having to be removed off the end of the ways.

The tailstock center 21 is mounted in a ram 22 and is moved axially by means of the tailstock handwheel 23. The ram 22 is mounted in the split-frame 24 and is secured in position by the ram clamp screw 25.

The headstock assembly 6 comprises a housing 26 dovetailed on the vertical ways 5. The assembly is moved vertically along said ways by means of the vertical feed screw 27 operated by the vertical feed handwheel 28. The headstock housing 26 carries a driven spindle 29 on one end of which is mounted a step-cone pulley 30. The spindle 29 is provided with a collet for handling barstock, a faceplate or a chuck for handling irregular work pieces, or with a spring chuck and collet for securing an end mill or other milling cutters. A spring chuck and collet 31a for securing the end mill 32a is illustrated in FIGS. 1, 2 and 3. FIG. 7 illustrates a collet 31b in place for handling barstock. The position of the headstock housing is secured by the headstock clamp 33. The lowermost position is determined by the stop 34, FIG. 2, at which position the axis of the spindle 29 is coaxial with that of the tailstock center 21.

As illustrated in FIG. 3, the spindle 29 is provided with a V-belt 35 extending from any one of the pulleys of the step-cone pulley 30 to a pulley 36 mounted on the driving motor 37. In order to properly tension the belt 35, the driving motor 37 is mounted on a bracket 38 pivoted as at 39 from any rigid support such as the bench 2 illustrated herein. In this manner the weight of the motor itself under the force of gravity tensions the V-belt drive.

It will be apparent that since the cutting speeds required for milling and ordinary lathe work vary considerably for a given work material and tool material, the spindle speed must be reduced substantially when fitted with a milling cutter and performing a milling operation. A multiple-belt speed reducer, illustrated in FIG. 4, is used to effect this speed reduction. During the milling operation the single V-belt 35 is removed and replaced by the multiple-belt and pulley system having the same overall length from the motor pulley 36 to the step-cone pulley 30 as the single belt 35. This speed reducer assembly comprises a first belt 40 extending from the pulley 36 mounted on the motor shaft to an intermediate pulley assembly 41 which is composed of a large diameter pulley 42 and a smaller diameter pulley 43 cast as a unit, as appears in FIG. 5. The unitary pulleys 42 and 43 carry a stub shaft 44 upon which is pivoted a second small diameter pulley 45. A second belt 46 extends from the pulley 43 to the step-cone pulley 30 on the spindle and a third belt 47, which functions entirely as a means for stabilizing the system, extends from the pulley 45 to any smaller sheave on the step-cone pulley 30, as illustrated in FIG. 4. The belt 47 is provided to prevent the pulley assembly 41 from twisting under the turning moment developed by belts 40 and 46. With the foregoing multiple-belt speed reducer effective speed reductions may be accomplished at a minimum of cost and without auxiliary gearing and countershafts generally necessary to make such a speed change.

It will be apparent that the foregoing machine tool can be used for either milling work or lathe work by merely interchanging tools and tool and workpiece holding devices. The unit as illustrated in FIG. 1 is set up for milling work. The spindle 29 carries a chuck and collet holder 31a of a type familiar to those skilled in this art in which is secured an end mill 32a. The workpiece is held in the removable vise 12a carried on the cross-feed table 9. The vise 12a is of the familiar universal type and is secured in a hole 48 provided therefor in the table by means of a pair of setscrews 49. The vise 12a is replaceable with a compound tool rest 12b carrying a cutting tool 50 of a type familiar to those skilled in this art as shown in FIG. 7. In conjunction with the compound tool rest 12b, the spindle 29 is provided with a collet, faceplate, or chuck for holding the workpiece when turning work is performed. FIG. 7 illustrates this setup with a barstock workpiece 51 secured in the collet 31b and supported on the tailstock center 21.

The foregoing detailed description of an embodiment of the present invention is given for clearness of understanding only, and no unnecessary limitations should be understood therefrom, for modifications will be obvious to those skilled in the art.

I claim:

1. A multiple belt drive means comprising in combination a first shaft; a first pulley mounted on and rotatable with said first shaft; a second shaft; a step-cone pulley mounted on and rotatable with said second shaft; a stub-shaft floatingly suspended between said first and second shafts; a first end pulley rotatably mounted on said stub-shaft; a second end pulley mounted on said stub-shaft and rotatable therewith; an intermediate pulley mounted between said first and second end pulleys, on and rotatable with said stub-shaft; a first belt embracing said first pulley and said intermediate pulley; a second belt embracing said first end pulley and one step of said step-cone pulley; a third belt embracing said second end pulley and another step of said step-cone pulley whereby the floating suspension of said stub-shaft, and the pulleys thereon, is effected by said first, second and third belts.

2. A multiple belt speed reducer comprising a drive shaft; a first pulley mounted on and rotatable with said drive shaft; a driven shaft; a step-cone pulley mounted on and rotatable with said driven shaft; an intermediate pulley assembly floatingly suspended between said drive and driven shaft, including a stub-shaft, a first end pulley rotatably mounted on said stub-shaft, a second end pulley mounted on and rotatable with said stub-shaft, and an intermediate pulley mounted between said first and second end pulleys on and rotatable with said stub-shaft and having a diameter greater than the diameter of said first pulley and of said second end pulley; a first belt embracing said first pulley and said intermediate pulley; a second belt embracing said second end pulley and one step of said step-cone pulley; and a third belt embracing said first end pulley and another step of said step-cone pulley whereby said first, second and third belts floatingly suspend said intermediate pulley assembly between said drive and driven shafts.

References Cited by the Examiner

UNITED STATES PATENTS

| | | | |
|---|---|---|---|
| 578,701 | 3/97 | Mette et al. | 74—219 |
| 1,909,522 | 5/33 | Collins | 82—28 X |
| 2,127,745 | 8/38 | Lochman | 82—28 |

WILLIAM W. DYER, Jr., *Primary Examiner.*